United States Patent
Xu et al.

(10) Patent No.: US 9,846,082 B2
(45) Date of Patent: Dec. 19, 2017

(54) INFRARED THERMOMETER WITH SIGHTING DEVICE AND METHOD FOR MEASURING TEMPERATURE OF ENERGY ZONE USING SAME

(71) Applicant: Fluke Corporation, Everett, WA (US)

(72) Inventors: Zumao Xu, Beijing (CN); Kaiyuan Lv, Beijing (CN)

(73) Assignee: Fluke Corporation, Everett, WA (US)

( * ) Notice: Subject to any disclaimer, the term of this patent is extended or adjusted under 35 U.S.C. 154(b) by 381 days.

(21) Appl. No.: 14/613,664

(22) Filed: Feb. 4, 2015

(65) Prior Publication Data

US 2015/0233766 A1  Aug. 20, 2015

(30) Foreign Application Priority Data

Feb. 14, 2014 (CN) .......................... 2014 1 0050790

(51) Int. Cl.
*G01J 5/08* (2006.01)
*G01J 5/28* (2006.01)

(52) U.S. Cl.
CPC .......... *G01J 5/0859* (2013.01); *G01J 5/0806* (2013.01); *G01J 5/28* (2013.01)

(58) Field of Classification Search
CPC .......... G01J 5/0806; G01J 5/0859; G01J 5/28
See application file for complete search history.

(56) References Cited

U.S. PATENT DOCUMENTS

| 3,641,348 A | * | 2/1972 | Schwarz | G02B 23/12 250/233 |
| 3,672,782 A | * | 6/1972 | Akin, Jr. | G02B 27/32 356/251 |
| 4,081,678 A | | 3/1978 | Macall | |
| 4,142,801 A | | 3/1979 | Calder et al. | |
| 4,494,881 A | * | 1/1985 | Everest | G01J 5/08 250/353 |
| 5,035,472 A | * | 7/1991 | Hansen | F41G 11/001 250/333 |

(Continued)

OTHER PUBLICATIONS

European Search Report dated Jul. 20, 2015 for corresponding European Application No. 15155086.0-1562, 8 pages.

*Primary Examiner* — Randy Gibson
(74) *Attorney, Agent, or Firm* — Seed Intellectual Property Law Group LLP

(57) ABSTRACT

An infrared thermometer measures a temperature of an energy zone. The infrared thermometer comprises a beam splitter for splitting an incident light beam from an energy zone into an infrared light beam and a visible light beam; an infrared detector for detecting the infrared light beam and generating a signal indicative of a temperature of the energy zone according to the detected infrared light beam; and a sighting device having an optical module for generating a reflective reticle image and transmitting the visible light beam to generate a target image at a sight window, wherein the sighting device is configured to superimpose the reflective reticle image over the target image at the sight window to align the infrared detector with the energy zone. The infrared thermometer and an associated measurement method facilitate the alignment of the energy zone by the users, thereby improving the accuracy of the measurement.

16 Claims, 5 Drawing Sheets

(56) References Cited

U.S. PATENT DOCUMENTS

| | | | | |
|---|---|---|---|---|
| 5,085,525 | A * | 2/1992 | Bartosiak | G01J 5/08 250/334 |
| 5,172,978 | A * | 12/1992 | Nomura | G01J 5/08 250/353 |
| 5,388,907 | A * | 2/1995 | Aoyama | G01J 5/02 250/201.2 |
| 5,524,984 | A * | 6/1996 | Hollander | G01J 5/02 33/DIG. 21 |
| 5,613,777 | A * | 3/1997 | Ridley | G01J 5/041 356/43 |
| 5,790,586 | A * | 8/1998 | Hilton, Jr. | G01J 5/02 374/124 |
| 5,836,694 | A | 11/1998 | Nguyen | |
| 6,095,682 | A * | 8/2000 | Hollander | G01D 21/02 374/121 |
| 7,093,974 | B2 * | 8/2006 | Kienitz | G01J 5/02 348/E5.026 |
| 7,355,178 | B2 * | 4/2008 | Everest | G01J 5/08 250/338.1 |
| 7,390,124 | B2 * | 6/2008 | Kienitz | G01J 5/08 250/338.1 |
| 7,545,492 | B2 * | 6/2009 | Kienitz | F41G 7/263 356/247 |
| 7,611,278 | B2 * | 11/2009 | Hollander | G01J 5/0044 374/121 |
| 8,240,912 | B2 * | 8/2012 | Schreher | G01J 5/0846 374/100 |
| 8,466,797 | B2 * | 6/2013 | Schworer | G01J 5/02 340/588 |
| 2002/0048307 | A1 * | 4/2002 | Schmidt | G01J 5/08 374/121 |
| 2002/0167603 | A1 * | 11/2002 | Kato | H04N 5/238 348/341 |
| 2003/0185273 | A1 * | 10/2003 | Hollander | G01J 5/02 374/121 |
| 2005/0201444 | A1 * | 9/2005 | Hollander | G01J 5/02 374/121 |
| 2005/0279940 | A1 * | 12/2005 | Everest | G01J 5/08 250/338.1 |
| 2006/0010761 | A1 | 1/2006 | Staley, III | |
| 2006/0114966 | A1 * | 6/2006 | Kienitz | G01J 5/08 374/130 |
| 2006/0289772 | A1 * | 12/2006 | Johnson | G01C 3/08 250/370.08 |
| 2010/0040109 | A1 * | 2/2010 | Schreher | G01J 5/0846 374/124 |
| 2011/0121978 | A1 * | 5/2011 | Schworer | G01J 5/02 340/588 |
| 2011/0243182 | A1 * | 10/2011 | Tetzlaff | G01J 5/02 374/131 |
| 2012/0159833 | A1 | 6/2012 | Hakanson et al. | |
| 2014/0026464 | A1 | 1/2014 | Wiklund | |
| 2014/0346377 | A1 * | 11/2014 | Willmott | G01J 5/0859 250/578.1 |
| 2015/0176947 | A1 * | 6/2015 | Zaitsev | G01J 5/027 250/348 |
| 2015/0192389 | A1 * | 7/2015 | Reichert | F41G 1/30 42/131 |

* cited by examiner

INFRARED THERMOMETER WITH SIGHTING DEVICE AND METHOD FOR MEASURING TEMPERATURE OF ENERGY ZONE USING SAME

FIELD

The present application relates to measurement technology, and more particularly to an infrared thermometer and a method for measuring the temperature of an energy zone.

BACKGROUND

Infrared thermometers are widely used in industry and daily life to measure the temperature of an energy zone on a surface of an object. However, when the infrared thermometer is used to measure the temperature of the energy zone, since the infrared ray cannot be seen, the energy zone can only be sighted by taking the infrared thermometer as close to the energy zone as possible, or by observing the position of the energy zone relative to the infrared thermometer. This sighting method cannot align an infrared detector of the infrared thermometer with the energy zone accurately, thereby affecting the accuracy of the measurement result.

Some infrared thermometers deploy a laser sighting device to align the infrared detector of the infrared thermometer with the energy zone. Such infrared thermometers can emit a laser beam to the energy zone to be measured to form a light spot (i.e., a red dot) for alignment on the surface of the energy zone. Accordingly, it can be determined whether the infrared detector is aligned with the energy zone by observing the position of the light spot relative to the energy zone and overlapping of the two. However, the energy zone may emit visible light of a high luminous intensity, such as when the temperature of the energy zone is high, for example, one thousand degrees Celsius or more. The visible light emitted from the energy zone may affect the observation of the light spot on the energy zone, which adversely affects the alignment of the infrared detector with the energy zone.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present application describes embodiments of an infrared thermometer and a measurement method by which the energy zone to be measured can be sighted with high accuracy.

In one aspect, the present application describes an embodiment of an infrared thermometer. The thermometer comprises a beam splitter for splitting an incident light beam from an energy zone into an infrared light beam and a visible light beam; an infrared detector for detecting the infrared light beam and generating a signal indicative of a temperature of the energy zone according to the detected infrared light beam; and a sighting device having an optical module for generating a reflective reticle image and transmitting the visible light beam to generate a target image at a sight window, wherein the sighting device is configured to superimpose the reflective reticle image over the target image at the sight window to align the infrared detector with the energy zone.

In certain embodiments of the infrared thermometer, the incident light beam from the energy zone is split into the infrared light beam for temperature measurement and the visible light beam to be sighted by a user. Moreover, the infrared thermometer also provides the sighting device for aligning the infrared detector with the energy zone. The sighting device is a red-dot sighting device which generates the reflective reticle image overlapping with the target image at the sight window, rather than a light pattern directly superimposed on a physical surface of the energy zone. Thus, it is more convenient for the user to align to the energy zone using the infrared thermometer of the present application.

In certain embodiments, the infrared thermometer further comprises an optical attenuator coupled between the beam splitter and the sighting device for reducing luminous intensity of the visible light beam. When the luminous intensity of the incident light beam, especially its visible light portion, is relatively high, the optical attenuator can prevent the eyes of the user from being hurt and increase the ratio of luminous intensity between the reticle image and the target image formed by the visible light beam such that the user can distinguish the two images easily.

In certain embodiments, the sighting device further comprises a light source for emitting a reference light beam, and the optical module comprises a reflective surface for reflecting the reference light beam to the sight window to generate the reflective reticle image at the sight window.

In certain embodiments, the optical module comprises a light splitter having a concave reflective surface, the light splitter being configured to transmit the visible light beam to the sight window and reflect the reference light beam to the sight window, wherein the reflective surface is the concave reflective surface of the light splitter.

In certain embodiments, the optical module comprises a convex lens for converging the reference light beam to generate the reticle image; and a beam combiner for transmitting the visible light beam to the sight window and reflecting the reticle image formed by the reference light beam to the sight window, wherein the reflective surface is at a side of the beam combiner facing towards the sight window.

In certain embodiments, the optical module further comprises an auxiliary lens module for converging or diverging the visible light beam and/or the reference light beam.

In certain embodiments, the light source comprises at least one light emitting diode or laser diode. The power consumption of the diodes is low, thus they are especially suitable for use in portable infrared thermometers.

In certain embodiments, the at least one light emitting diode or laser diode comprises a red light diode, a green light diode, a blue light diode or any combination thereof. In this way, the user can choose the color of the reference light beam (e.g., the color of the reticle image) to be more clearly distinguishing from the color of the incident light beam according to the color of the incident light beam, which improves the observation of images.

In certain embodiments, the sighting device further comprises a reticle for shaping the reference light beam. The shape and size of the reticle image can be changed by adjusting the shape of the reference light beam.

In certain embodiments, the reticle has a central opening and/or an annular opening at the periphery of the central opening. The pattern formed by the central opening can be used to determine the center of the energy zone, while the pattern formed by the annular opening can be used to determine the scope of the energy zone (e.g., to delineate the periphery of the energy zone).

In certain embodiments, the infrared thermometer further comprises an infrared converging lens module for converging the infrared light beam to the infrared detector.

In certain embodiments, the infrared thermometer further comprises a flat mirror coupled between the beam splitter and the sighting device for reflecting the visible light beam to the sighting device.

In certain embodiments, the light splitter comprises a beam splitting layer in parallel with the flat mirror.

In certain embodiments, the infrared detector has a first field of view smaller than or equal to a second field of view of the reflective reticle image.

In another aspect, the present application describes an embodiment of a method for measuring a temperature of an energy zone. The method comprises splitting an incident light beam from an energy zone into an infrared light beam and a visible light beam; generating a reflective reticle image; transmitting the visible light beam to generate a target image at a sight window; aligning an infrared detector for detecting the infrared light beam with the energy zone by superimposing the reflective reticle image over the target image at the sight window; and detecting the infrared light beam by the infrared detector to generate a signal indicative of a temperature of the energy zone according to the detected infrared light beam.

In certain embodiments, before transmitting the visible light beam to generate the target image at the sight window, the method further comprises reducing the luminous intensity of the visible light beam.

In certain embodiments, generating the reflective reticle image comprises providing a light source for emitting a reference light beam; and reflecting the reference light beam convergingly to generate the reflective reticle image at the sight window.

In certain embodiments, the method further comprises adjusting the color of the reference light beam.

In certain embodiments, generating the reflective reticle image further comprises shaping the reference light beam.

In certain embodiments, the reticle image has a central pattern and/or an annular pattern at the periphery of the central pattern.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

DESCRIPTION OF THE DRAWINGS

The aforementioned features and other features of the present application will be fully understood by reading the following description, referring to the accompanying drawings and the appended claims. It will be understood that these accompanying drawings merely illustrate certain embodiments in accordance with the present application and should not be considered as limitation of the scope of the present application. Unless otherwise specified, the accompanying drawings need not be proportional, and similar reference characters generally denote similar elements.

DETAILED DESCRIPTION

The following detailed description refers to the accompanying drawings which are a part of the present application. The illustrative embodiments described in the detailed description, the accompanying drawings and the claims are not limiting, and other embodiments may be adopted, or modifications may be made without deviating from the spirit and subject of the present application. It should be understood that the various aspects of the present application described and graphically presented herein may be arranged, replaced, combined, divided and designed in many different configurations, and these different configurations are implicitly comprised in the present application.

Figure 1:
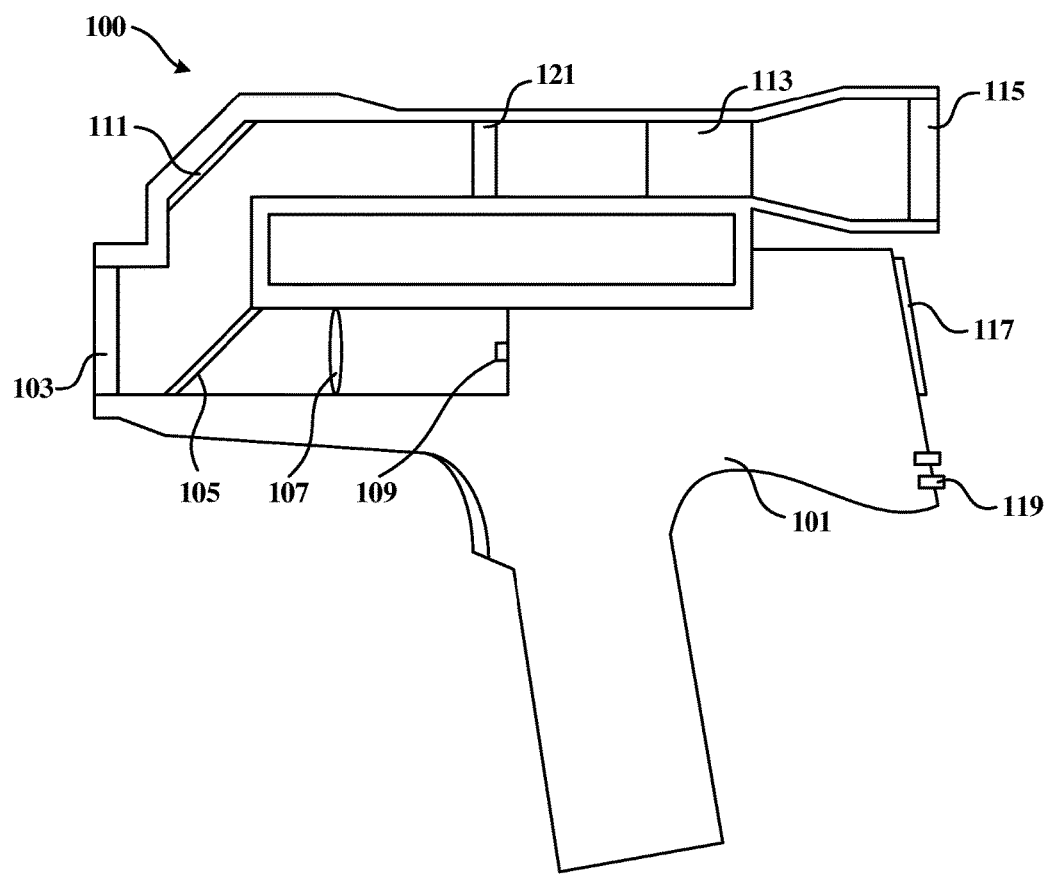
FIG. 1 shows a structure diagram of an infrared thermometer according to an embodiment of the present application.
Figure 2:
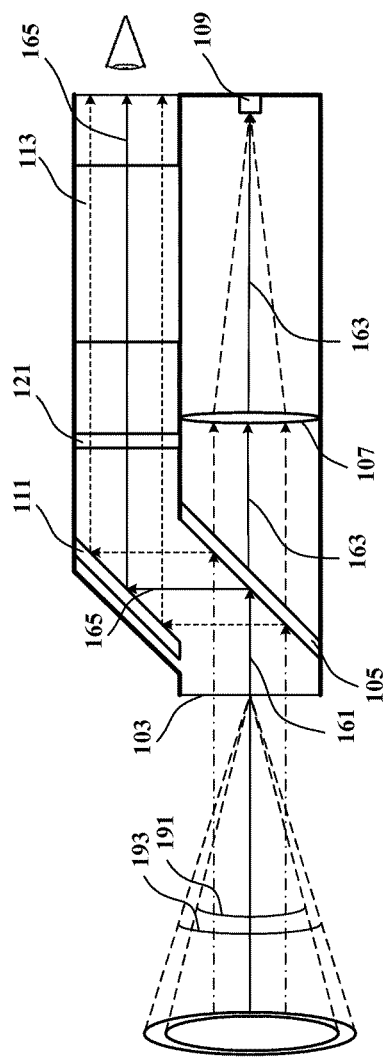
FIG. 2 shows a light path of the infrared thermometer in FIG. 1.

FIGS. 1 and 2 show an infrared thermometer 100 according to an embodiment of the present application. FIG. 1 shows a structure diagram of the infrared thermometer 100 and FIG. 2 shows a light path of the infrared thermometer 100. The infrared thermometer 100 can be used to measure the temperature of an energy zone on a surface of an object. In some embodiments, the infrared thermometer 100 may be an infrared pyrometer for measuring the temperature of a high-temperature energy zone, which is capable of, for example, measuring a temperature of 1000° Celsius or higher. It should be noted, although the infrared thermometer 100 is illustrated as a portable structure in FIG. 1, it can also be in forms of any other suitable shapes and sizes, for example, formed as a vertical structure (e.g., supported by a frame).

As shown in FIGS. 1 and 2, the infrared thermometer 100 has a housing 101, which accommodates various optical and electrical components of the infrared thermometer 100. An incident window 103 is disposed at a front end of the housing 101. Light from the energy zone to be measured (i.e., an incident light beam 161 may enter the interior of the infrared thermometer 100). The incident light beam 161 may include light emitted from the energy zone and/or light reflected from the energy zone. Generally, the energy zone can at least reflect ambient light and emit infrared light as long as the temperature of the energy zone is above absolute zero. Thus, the incident light beam 161 at least includes an infrared light portion and a visible light portion. In certain cases, such as when the temperature of the energy zone is relatively high (e.g., when the temperature of a solid object is above 500° Celsius), the incident light beam 161 further includes visible light emitted from the energy zone.

The infrared thermometer 100 further includes a beam splitter 105 for splitting the incident light beam 161 from the energy zone into an infrared light beam 163 and a visible light beam 165 (see FIG. 2). As shown in the example of FIG. 2, the infrared light beam 163 is a transmissive light beam transmitted through the beam splitter 105, and the visible light beam 165 is a reflective light beam reflected by the beam splitter 105. In certain examples, the infrared light beam 163 may be the reflective light beam while the visible light beam 165 may be the transmissive light beam. In certain examples, the beam splitter 105 may include two triangular prisms, which are bonded with each other at their bases with adhesives such as polyester, epoxy or polyurethane. The adhesive layer forms a beam splitting layer of the beam splitter 105. The beam splitting layer may be designed to have a thickness that a portion of the incident light beam 161 emitted thereto is reflected away and another portion of the incident light beam 161 is transmitted through the beam splitter 105 due to frustrated total internal reflection. The beam splitter 105 may use other optical structures suitable for light splitting. For example, the beam splitter 105 may be a Wollaston prism capable of transmitting two beams of polarized light with their polarization directions perpendicular to each other. In FIG. 2, the infrared light portion of the incident light beam 161 may be transmitted through the beam splitter 105 to form the infrared light beam 163, and the visible portion of the incident light beam 161 may be reflected by the beam splitter 105 to form the visible light beam 165. In certain examples, the incident light beam 161 from the energy zone is a substantially collimated light beam, and therefore the infrared light beam 163 and the visible light beam 165 are substantially collimated light beams.

The infrared thermometer 100 further includes an infrared detector 109 and a sighting device 113. The infrared detector 109 is used to detect the infrared light beam 163 and generate a signal indicative of the temperature of the energy zone according to the detected infrared light beam. The infrared detector 109 is capable of measuring a power distribution of the infrared light radiation (i.e., the infrared light beam 163) generated by the energy zone, and further converting the power distribution of the infrared light radiation into the signal indicative of the temperature of the energy zone by its computing and processing circuits (not shown). The signal can be displayed by a display unit 117 of the infrared thermometer 100 such that the user can observe the measurement result. In certain examples, the infrared detector 109 may be an infrared imaging array capable of imaging a distribution of the temperature of the energy zone to an image signal according to the infrared light emitted from different positions of the energy zone. The user may control the computing and processing circuits to analyze and process the measurement result via input buttons 119. In certain examples, the infrared thermometer 100 includes an infrared converging lens module 107 coupled between the beam splitter 105 and the infrared detector 109 for converging the infrared light beam 163 to the infrared detector 109. For example, the infrared converging lens module 107 may include one or more convex lens, concave mirrors, or any other suitable lens or mirrors or any combination thereof. A detection surface of the infrared detector 109 is substantially at or near a focus of the infrared converging lens module 107. In certain examples, the infrared thermometer 100 may not include the infrared converging lens module 107 for converging the infrared light beam 163, and the infrared light beam 163 may be directly emitted onto the infrared detector 109.

In certain embodiments, the sighting device 113 has an optical module (not shown) for generating a reflective reticle image and transmitting the visible light beam 165 to generate a target image at a sight window 115. The sighting device 113 is capable of superimposing the reflective reticle image over the target image at the sight window 115 to align the infrared detector 109 with the energy zone. The term "align" or "alignment" means that at least most of the infrared light from the energy zone can be emitted onto and received by the infrared detector 109. In certain examples, aligning the infrared detector 109 with the energy zone means that at least 50%, 60%, 70%, 80%, 90%, 95%, or 99% of the energy of the infrared light from the energy zone can be received by the infrared detector 109. The term "reflective reticle image" refers to a reticle image generated by light reflected by a mirror. In the embodiment shown in FIGS. 1 and 2, the infrared thermometer 100 includes a flat mirror 111 coupled between the beam splitter 105 and the sighting device 113 for reflecting the visible light beam 165 to the sighting device 113. Preferably, the beam splitter 105 may have a beam splitting layer in parallel with the flat mirror 111 such that the visible light beam 165 may propagate in a direction identical to that of the incident light beam 161 after reflected by the beam splitting layer and the flat mirror 111. Furthermore, the infrared light beam 163 transmitted by the beam splitter 105 may propagate in a direction identical to that of the incident light beam 161, thus the propagation directions of the infrared light beam 163 and the visible light beam 165 are substantially the same.

The sighting device 113 may use a red-dot sighting device that is generally used in gun sights. The red-dot sighting device provides the reticle image in the form of a visual pattern for target sighting by the user. The reticle image in the form of a visual pattern is generated by the reflection of light, which is analog to the transmission of light. In other words, the reticle image generated by the sighting device 113 is analog to an image generated by the light from the position of the energy zone with a similar shape and size, thereby the user may align the infrared detector 109 with the energy zone by observing the overlapping between the target image generated by the visible light beam 165 and the reflective reticle image at the sight window 115.

In certain examples, the sighting device 113 has a light source for emitting a reference light beam so as to generate the reticle image and project the reticle image at the sight window 115. An image of the light source may be imaged as the reticle image by the optical module. The light source may have at least one light emitting diode or laser diode such as a red light diode, a green light diode, a blue light diode or any suitable light emitting diode or laser diode emitting light of other colors. In certain examples, the light source may include a combination of these diodes emitting light of different colors, thereby the color of the reference light beam emitted from the light source can be adjusted by turning on or off a portion of the combination of diodes. Preferably, the luminous intensity of the reference light beam may be adjusted by changing the power of the light emitting diode or the laser diode. In this way, when the visible light beam 165 has a relative high luminous intensity, the luminous intensity of the reference light beam may be increased to improve the ratio of luminous intensity of the reference light beam relative to the visible light beam 165 such that it is easier for the user to distinguish the reticle image from the target image generated by the visible light beam 165. Some exemplary structures of the sighting device 113 will be elaborated below with reference to FIGS. 7 and 8.

In certain examples, the sighting device 113 may include a reticle for shaping the reference light beam. As the reference light beam emitted from the light source may have a circular or oval cross section, the reticle may adjust the shape and size (i.e., the cross section) of the reference light beam such that the reticle image projected onto the sight window 115 may have a predefined shape and size. The reticle may be an opaque plate having a certain light-pervious region that is positioned in front of the light source. The opaque plate may block off most of the reference light beam, thereby allowing the remainder of the reference light beam emitted to the certain light-pervious region to pass therethrough. In this way, the shape or the cross section of the reference light beam can be adjusted such that the reticle image projected onto the sight window 115 is identical to the certain light-pervious region of the reticle in shape. In certain examples, the reticle has a central opening and/or an annular opening at the periphery of the central opening. Accordingly, the reticle image has a central pattern and/or an annular pattern at the periphery of the central pattern. The central pattern can be used to determine the center of the energy zone, while the annular pattern can be used to determine the scope of the energy zone, i.e., to delineate the periphery of the energy zone. In this case, the reticle image is an image of the reticle generated by the optical module, and the optical module is substantially an optical imaging system for imaging the pattern on the reticle to the sight window 115. It will be appreciated that the scope of the reticle image is associated with the measuring scope of the infrared detector 109, which will be elaborated below.

Figure 3:
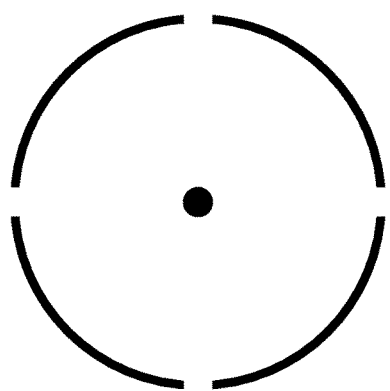
FIG. 3 shows an exemplary pattern of a reticle image generated by a sighting device of the infrared thermometer in FIG. 1.
Figure 4:
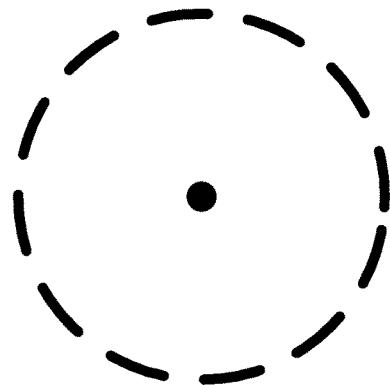
FIG. 4 shows another exemplary pattern of the reticle image generated by the sighting device of the infrared thermometer in FIG. 1.
Figure 5:
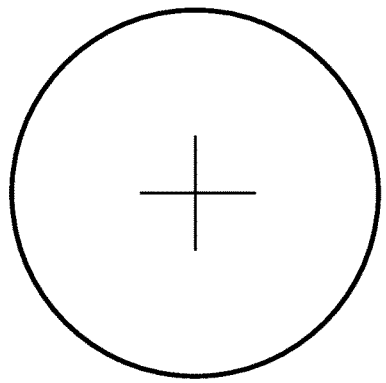
FIG. 5 shows a further exemplary pattern of the reticle image generated by the sighting device of the infrared thermometer in FIG. 1.
Figure 6:
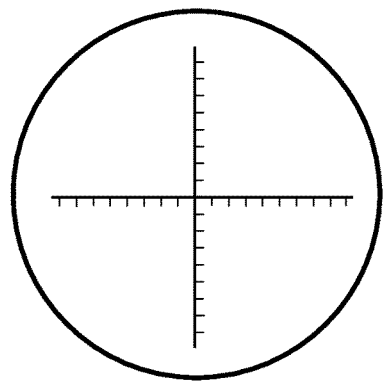
FIG. 6 shows yet a further exemplary pattern of the reticle image generated by the sighting device of the infrared thermometer in FIG. 1.

FIGS. 3-6 show four exemplary patterns of the reticle image generated by the sighting device. All four reticle images have a central pattern and an annular pattern. In FIG. 3, the central pattern is a dot-shaped pattern and the annular pattern has four substantially quarter arc lines. In FIG. 4, the central pattern is a dot-shaped pattern and the annular pattern has twelve short arc lines uniformly spaced apart from each other and around the central pattern. In FIG. 5, the central pattern is a cross pattern and the annular pattern is a circular pattern. In FIG. 6, the central pattern is a cross pattern with scales and the annular pattern is a circular pattern. It will be appreciated that the patterns of the reticle images shown in FIGS. 3-6 are exemplary and not limiting. In certain examples, the central pattern may be any other patterns suitable for alignment, such as a ring.

Figure 7:
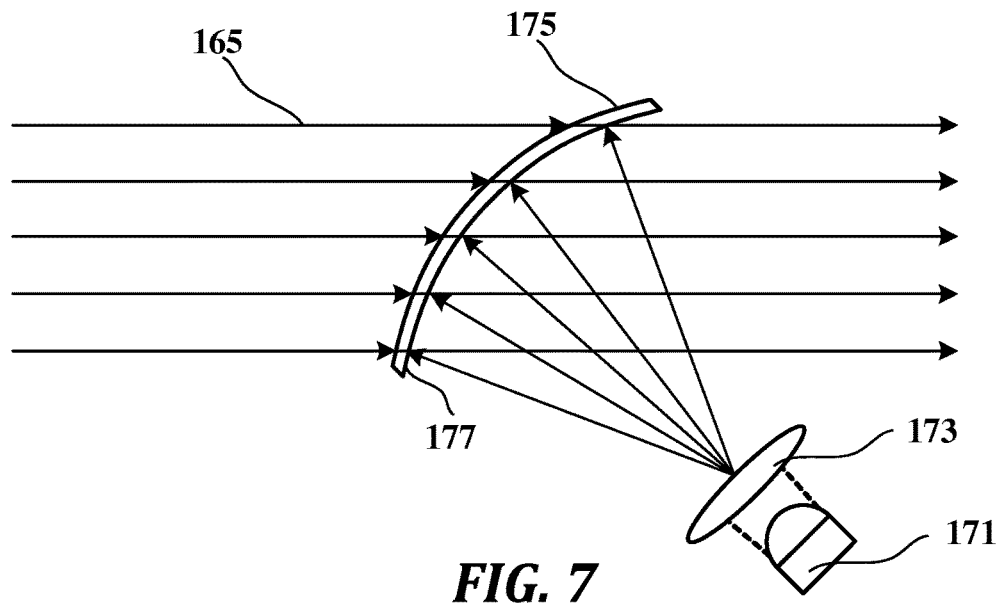
FIG. 7 shows an exemplary structure of the sighting device of the infrared thermometer in FIG. 1.

FIG. 7 shows an exemplary structure of the sighting device of the infrared thermometer 100 in FIG. 1.

As shown in FIG. 7, the sighting device includes a light source 171, a reticle 173, and an optical module having a light splitter 175. The light splitter 175 is used to transmit the visible light beam 165 to the sight window (not shown) and reflect the reference light beam from the light source 171 to the sight window. For example, the light splitter 175 may be a negative meniscus coated with a light splitting film. The light splitting film can transmit a portion of a light beam emitted thereon and reflect the remainder of the light beam. Specifically, the light splitter 175 has a concave reflective surface 177 facing towards the light source 171, and the light source 171 is positioned outside a focus of the concave reflective surface 177, for example, at a distance farther than a focal length of the concave reflective surface 177 but shorter than twice the focal length. An optical axis of the light splitter 175 slightly inclines relative to the propagation direction of the visible light beam to avoid the light source 171 and blocks the propagation of the visible light beam 165. The other side of the light splitter 175 may be a convex surface corresponding to the concave reflective surface 177 such that the visible light beam 165 can enter into the light splitter 175 from the convex surface and be transmitted out of the light splitter 175 through the concave reflective surface 177. In certain examples, the two surfaces of the negative meniscus may have the same radius of curvature (i.e., the negative meniscus has a uniform thickness) or have different radiuses of curvature. In other words, the light splitter 175 may or may not converge or diverge the visible light beam 165. In certain examples, the optical module may be a plano concave lens coated with a light splitting film. One side of the plano concave lens is a concave reflective surface and the other side of the plano concave lens is a flat surface. The concave reflective surface side of the plano concave lens faces towards the light source 171 and the reticle 173.

The reference light beam emitted from the light source 171 is converged after reflected by the concave reflective surface 177, and the reflected reference light beam is projected onto the sight window 115 with the visible light beam 165 (which is a collimated light beam). In this way, when the reticle image overlaps with the target image generated by the visible light beam 165 at the sight window 115, the infrared detector is aligned with the energy zone.

In certain examples, the optical module may include an auxiliary lens module (not shown), which can be used to converge or diverge the visible light beam and/or the reference light beam. The auxiliary lens module may include one or more convex lenses, concave lenses or any other suitable lenses, which cooperates with the light splitter 175 to generate the target image and/or the reticle image at the sight window. In certain examples, the auxiliary lens module may be positioned in front of the light splitter 175, i.e., the visible light beam 165 successively passes through the auxiliary lens module and the light splitter 175. The auxiliary lens module may have a fixed focal length or a variable focal length. The auxiliary lens module can diverge or converge the visible light beam 165, thus the size of the target image can be adjusted by properly designing the focal length of the auxiliary lens module. In this way, the size ratio of the target image to the reticle image can be adjusted. In certain examples, the auxiliary lens module may be positioned behind the light splitter 175 (i.e., the visible light beam 165 transmitted by the light splitter 175 and the reference light beam reflected by the light splitter 175 may be converged or diverged by the auxiliary lens module to adjust the size of the target image and the reticle image simultaneously). Such structure further improves the ability of the sighting device to adjust the target image and the reticle image.

Figure 8:
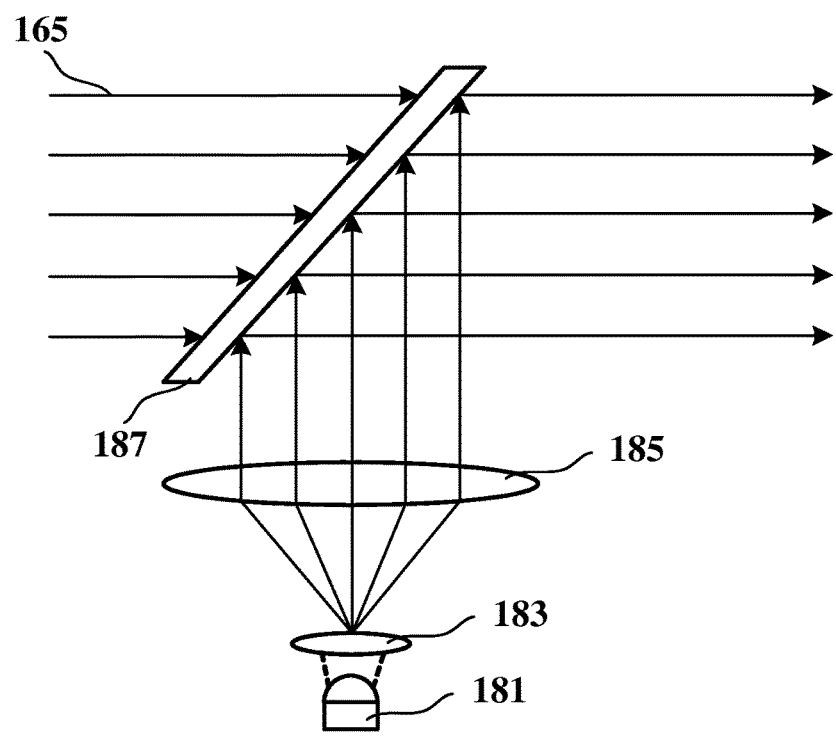
FIG. 8 shows another exemplary structure of the sighting device of the infrared thermometer in FIG. 1.

FIG. 8 shows another exemplary structure of the sighting device of the infrared thermometer 100 in FIG. 1.

As shown in FIG. 8, the sighting device includes a light source 181, a reticle 183, and an optical module having a convex lens 185 and a beam combiner 187. The convex lens 185 is used to converge a reference light beam emitted from the light source to generate the reticle image. The light source 181 is positioned outside a focus of the convex lens 185. The beam combiner 187 is used to transmit the visible light beam 165 to the sight window, and to reflect the reticle image generated by the reference light beam to the sight window. In other words, the reference light beam emitted from the light source 181 is successively converged by the convex lens 185, reflected by the beam combiner 187 and projected onto the sight window with the visible light beam 165 (which is a collimated light beam) transmitted by the beam combiner 187. In this way, when the reflective reticle image at the sight window overlaps with the target image generated by the visible light beam 165, the infrared detector is aligned with the energy zone. The beam combiner 187 may be a structure similar to a beam splitter (e.g., with a revised light path), or any other suitable optical component. In certain examples, the optical module may further include an auxiliary lens module (not shown) for diverging or converging the visible light beam and/or the reference light beam.

As can be seen, each of the concave reflective surfaces 177 in FIG. 7 and the convex lens 185 in FIG. 8 forms an optical imaging system. Such optical imaging systems can image the pattern (object) of the reticle onto the sight window for the observation of the user. The imaging of the optical imaging systems complies with the convex lens image formation rule or the concave mirror image formation rule. For example, in FIG. 7, when the light source 171 and the reticle 173 is at a distance farther than the focal length of the concave reflective surface 177 but shorter than twice the focal length, an inverted magnified real image of the reticle pattern may be generated at the sight window, and the distance between the sight window and the concave reflective surface 177 is farther than twice the focal length. When the light source 171 and the reticle 173 is at a distance farther than twice the focal length of the concave reflective surface 177, an inverted reduced real image may be generated at the sight window, and the distance between the sight window and the concave reflective surface 177 is farther than the focal length but shorter than twice the focal length.

For the infrared thermometer 100 of the above embodiment, with the beam splitter, the incident light beam from the energy zone can be split into the infrared light beam for temperature measurement and the visible light beam to be sighted by the user. Moreover, the infrared thermometer 100 also provides the sighting device for aligning the infrared detector with the energy zone. In certain examples, the sighting device is the red-dot sighting device that generates the reticle image overlapping with the target image at the sight window of the infrared thermometer 100, rather than a light pattern directly projected onto a physical surface of the energy zone. Thus, it is more convenient for the user to determine and align the infrared thermometer 100 with the energy zone.

Referring back to FIGS. 1 and 2, in some examples the infrared thermometer 100 may include a light attenuator 121 coupled between the beam splitter 105 and the sighting device 113, which can be used to reduce the luminous intensity of the visible light beam 165. The light attenuator 121 may be a plano lens with relatively low transmittance. When the luminous intensity of the incident light beam 161, especially its visible light portion, is relatively high, using the light attenuator 121 may prevent the eyes of the user from being hurt, and may increase the ratio of luminous intensity between the reticle image and the target image generated by the visible light beam 165 such that the user can distinguish the two images easily. Preferably, the light attenuator 121 may be alternatively coupled between the beam splitter 105 and the sighting device 113. Specifically, when the luminous intensity of the visible light beam 165 is relatively high, the user may dispose the light attenuator 121 between the beam splitter 105 and the sighting device 113 to reduce the luminous intensity of the visible light beam 165. When the luminous intensity of the visible light beam 165 is relatively low, the user may remove the light attenuator 121 from the light path of the visible light beam 165 to prevent the light attenuator 121 from reducing the luminous intensity of the visible light beam 165. In certain examples, the light attenuator 121 may include a group of light attenuating components that attenuate the luminous intensity of the visible light beam 165 differently. Moreover, the user may select one or more components from the set of light attenuating components and couple the selected components between the beam splitter 105 and the sighting device 113, to set the attenuation ratio according to the luminous intensity of the visible light beam 165.

As described above, the scope of the reticle image is associated with the measuring scope of the infrared detector 109. Still referring to FIG. 2, in certain examples the infrared thermometer 109 has a first field of view 191 smaller than or equal to a second field of view 193 of the reflective reticle image. For example, the angle of view of the first field of view 191 is smaller than or equal to that of the second field of view 193. In this case, when the target image of the energy zone overlaps with the reflective reticle image at the sight window 115, the scope of the energy zone covered by the reflective reticle image is smaller than or equal to the scope of the energy zone sampled or detected by the infrared detector 109. In other words, the scope delineated by the reflective reticle image always falls within the scope detected by the infrared detector 109, thus the measurement result is more accurate. It will be appreciated by those skilled in the art that the scope of the first field of view 191 of the infrared detector 109 depends on various parameters of the infrared thermometer 100 including the size of the detection surface of the infrared detector 109, the focal length of the infrared converging lens module 107, the size of the incident window 103, and the parameters of other optical components in the light path of the infrared light beam 163. Accordingly, the scope of the second field of view 193 of the reflective reticle image depends on the size of the reticle, the focal length of the converging surface or lens of the lens module of the sighting device 113, the size of the incident window 103, and the parameters of other optical components in the light path of the visible light beam 165.

Figure 9:
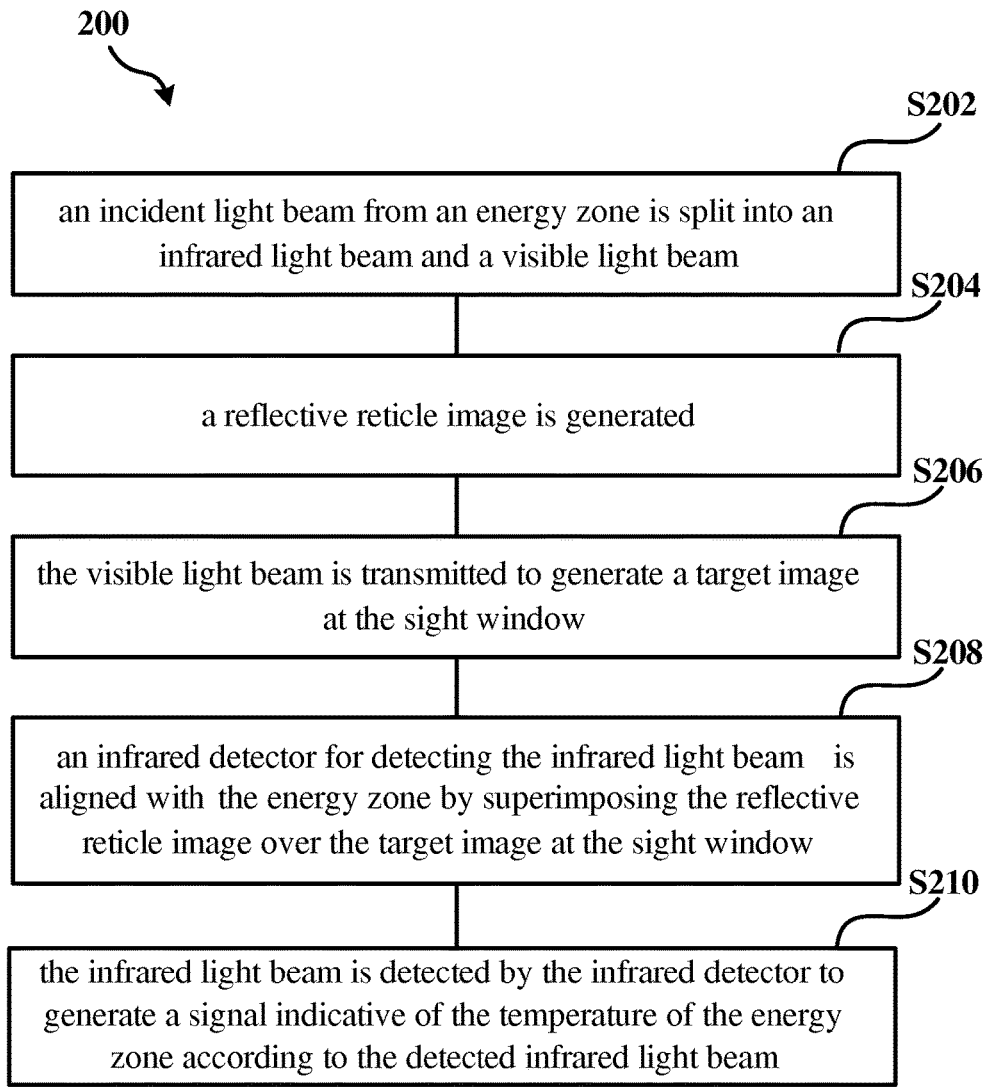
FIG. 9 shows a flow chart of a method for measuring a temperature of an energy zone according to another embodiment of the present application.

FIG. 9 shows a flow chart of a method 200 for measuring a temperature of an energy zone according to another embodiment of the present application. The method 200 may be used to determine the temperature of the energy zone by detecting infrared light emitted from the energy zone. For example, the temperature measurement method 200 can be implemented by using an infrared thermometer having an infrared detector.

As shown in FIG. 9, the method 200 begins with step S202, wherein an incident light beam from an energy zone is split into an infrared light beam and a visible light beam. For example, the incident light beam may contain a visible light portion and an infrared light portion, which can be split into the infrared light beam and the visible light beam propagating in different directions and/or paths by a beam splitter.

Afterwards, in step S204, a reflective reticle image is generated. The reflective reticle image is used for alignment with a target image generated by the visible light beam. In certain embodiments, step S204 may include providing a light source for emitting a reference light beam and reflecting the reference light beam convergingly to generate the reflective reticle image at the sight window. In certain embodiments, the reference light beam may be shaped so that the reticle image has various shapes suitable for sighting, such as a cross. For example, a reticle may be positioned in front of the light source to shape the reference light beam. In certain embodiments, the reflective reticle image may have a central pattern and an annular pattern at the periphery of the central pattern. The central pattern may be used to determine the center of the energy zone, and the annular pattern may be used to determine the scope of the energy zone, i.e., to delineate the periphery of the energy zone. In certain embodiments, in step S204, the color of the reference light beam may be adjusted such that the color of the reference light beam may be chosen to be more clearly distinguishing from the color of the incident light beam, which improves the observation of images.

Afterwards, in step S206, the visible light beam is transmitted to generate a target image at the sight window. Then, at step S208, an infrared detector for detecting the infrared light beam is aligned with the energy zone by superimposing the reflective reticle image over the target image at the sight window.

The reflective reticle image is a visual pattern generated by a red-dot sighting device, for example. The reflective reticle image of visual pattern is generated by the reflection of light, which is analog to the transmission of light. In other words, the generated reflective reticle image is analog to an image generated by the light from the position of the energy zone of a similar shape and size, thereby the user may align the infrared detector with the energy zone by observing the overlapping between the target image generated by the visible light beam and the reticle image at the sight window. In certain embodiments, prior to step S206, the method 200 further includes reducing the luminous intensity of the incident light beam. When the luminous intensity of the incident light beam, especially its visible light portion, is relatively high, pre-reducing the luminous intensity of the visible light beam can prevent the eyes of the user from being hurt and increase the ratio of luminous intensity between the reflective reticle image and the target image generated by the visible light beam such that the user can distinguish the two images easily.

Thereafter, in step S210, the infrared light beam is detected by the infrared detector to generate a signal indicative of the temperature of the energy zone according to the detected infrared light beam. The infrared detector is capable of measuring the power distribution of the infrared light radiation (i.e., the infrared light beam) generated by the energy zone, and further converting the spectrum of the infrared light radiation into the signal indicative of the temperature of the energy zone by a processor coupled to or integrated with the infrared detector. The signal can be further displayed such that the user can observe the measurement result.

As can be seen, for the above temperature measuring method 200, the incident light beam from the energy zone is split into the infrared light beam for temperature measurement and the visible light beam to be sighted by the user with an optical component such as a beam splitter. Moreover, different from the conventional laser alignment method, the method 200 aligns the infrared detector with the energy zone by superimposing the reticle image over the target image generated by the visible light beam at the sight window. Thus, it is more convenient for the user to align the infrared detector with the energy zone by using the measurement method of the present application.

It should be noted that, although several modules or sub-modules of the infrared thermometer have been described in the previous paragraphs, such division is exemplary and not mandatory. Practically, according to the embodiments of the present application, the functions and features of two or more modules described above may be embodied in one module. On the other hand, the function and feature of any one module described above may be embodied in two or more modules.

Furthermore, although the operation of a method according to the present application is illustrated with reference to the accompanying drawings in a specific sequence, the present application may be practiced using process flows that differ from that illustrated. Additionally, it should be noted that not all steps are required in every embodiment. In other words, one or more of the steps may be omitted or replaced, without departing from the spirit and scope of the invention. In certain embodiments, steps may be performed in different order, in parallel with one another, or omitted entirely, and/or certain additional steps may be performed without departing from the scope of the present application.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite articles "a" or "an" do not exclude a plurality. Any reference signs in the claims should not be construed as limiting the scope. The scope and spirit of the present application is defined by the appended claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. An infrared thermometer, comprising:
   a beam splitter configured to split an incident light beam from an energy zone into an infrared light beam and a visible light beam;
   an infrared detector configured to detect the infrared light beam and to generate a signal indicative of a temperature of the energy zone according to the detected infrared light beam;
   a sighting device having an optical module configured to generate a reflective reticle image and to transmit the visible light beam to generate a target image at a sight window, wherein the sighting device is configured to superimpose the reflective reticle image over the target image at the sight window to align the infrared detector with the energy zone;
   a flat mirror coupled in a light path between the beam splitter and the sighting device, the flat mirror configured to reflect the visible light beam from the beam splitter to the sighting device;
   a plano lens coupled between the flat mirror and the sighting device, the plano lens configured to reduce a luminous intensity of the visible light beam that is transmitted to the sight window; and
   an infrared converging lens module disposed between the beam splitter and the infrared detector, the infrared converging lens module configured to converge the infrared light beam to the infrared detector.

2. The infrared thermometer of claim 1, wherein the sighting device further comprises a light source configured to emit a reference light beam; and wherein the optical module comprises a reflective surface configured to reflect the reference light beam to the sight window to generate the reflective reticle image at the sight window.

3. The infrared thermometer of claim 2, wherein the optical module comprises:
   a light splitter having a concave reflective surface, wherein the light splitter is configured to transmit the visible light beam to the sight window and to reflect the reference light beam to the sight window, wherein the reflective surface is the concave reflective surface of the light splitter.

4. The infrared thermometer of claim 2, wherein the optical module comprises:
   a convex lens configured to converge the reference light beam to generate the reticle image; and
   a beam combiner configured to transmit the visible light beam to the sight window and to reflect the reticle image formed by the reference light beam to the sight window, wherein the reflective surface is at a side of the beam combiner facing towards the sight window.

5. The infrared thermometer of claim 2, wherein the optical module further comprises an auxiliary lens module configured to converge or diverge one or more of the visible light beam or the reference light beam.

6. The infrared thermometer of claim 2, wherein the light source comprises at least one light emitting diode or laser diode.

7. The infrared thermometer of claim 6, wherein the at least one light emitting diode or laser diode comprises one or more of a red light diode, a green light diode, a blue light diode, or any combination thereof.

8. The infrared thermometer of claim 2, wherein the sighting device comprises a reticle configured to shape the reference light beam.

9. The infrared thermometer of claim 8, wherein the reticle has one or more of a central opening or an annular opening at the periphery of the central opening.

10. The infrared thermometer of claim 1, wherein the beam splitter comprises a beam splitting layer in parallel with the flat mirror.

11. The infrared thermometer of claim 1, wherein the infrared detector has a first field of view smaller than or equal to a second field of view of the reflective reticle image.

12. A method for measuring a temperature of an energy zone, comprising:
   splitting an incident light beam from an energy zone into an infrared light beam and a visible light beam;
   converging the infrared light beam that is split from the incident right beam to the infrared detector;
   generating a reflective reticle image;
   transmitting the visible light beam to a flat mirror;
   transmitting the visible light beam from the flat mirror to a plano lens that is disposed between the flat mirror and a sight window;
   reducing a luminous intensity of the visible light beam using the plano lens;
   transmitting the visible light beam from the plano lens to the sight window;
   generating a target image at a sight window using the visible light transmitted from the plano lens;
   aligning an infrared detector with the energy zone by superimposing the reflective reticle image over the target image at the sight window;
   detecting, by the infrared detector, the infrared light beam; and
   generating a signal indicative of a temperature of the energy zone according to the detected infrared light beam.

13. The method of claim 12, wherein generating the reflective reticle image comprises:
   emitting a reference light beam from a light source; and
   reflecting the reference light beam convergingly to generate the reflective reticle image at the sight window.

14. The method of claim 13, wherein the method further comprises adjusting a color of the reference light beam.

15. The method of claim 13, wherein generating the reflective reticle image further comprises shaping the reference light beam.

16. The method of claim 15, wherein the reticle image has at least one of a central pattern or an annular pattern at the periphery of the central pattern.

* * * * *

UNITED STATES PATENT AND TRADEMARK OFFICE
CERTIFICATE OF CORRECTION

PATENT NO. : 9,846,082 B2
APPLICATION NO. : 14/613664
DATED : December 19, 2017
INVENTOR(S) : Zumao Xu et al.

Page 1 of 1

It is certified that error appears in the above-identified patent and that said Letters Patent is hereby corrected as shown below:

In the Claims

Column 14, Claim 12, Line 4:
"incident right" should read -- incident light --.

Signed and Sealed this
Sixteenth Day of July, 2019

Andrei Iancu
*Director of the United States Patent and Trademark Office*